May 19, 1936.  J. H. McMANUS  2,041,257

MILK BOTTLE HOLDER AND LOCKBOX

Filed March 26, 1935   2 Sheets-Sheet 1

Inventor
John H. McManus
Clive Hartson
By
Attorney

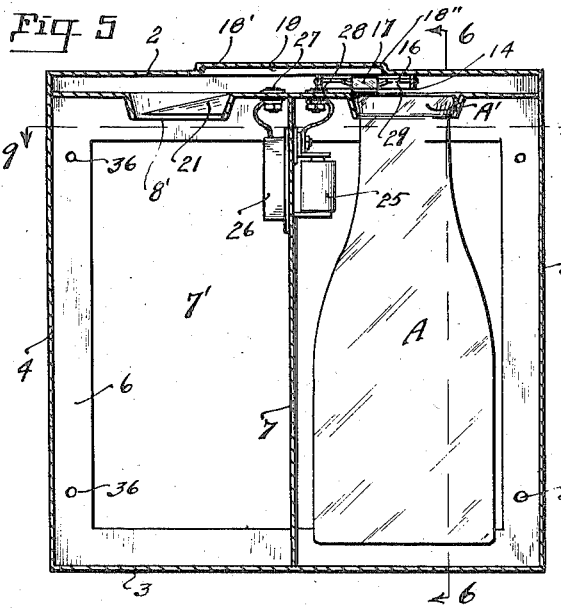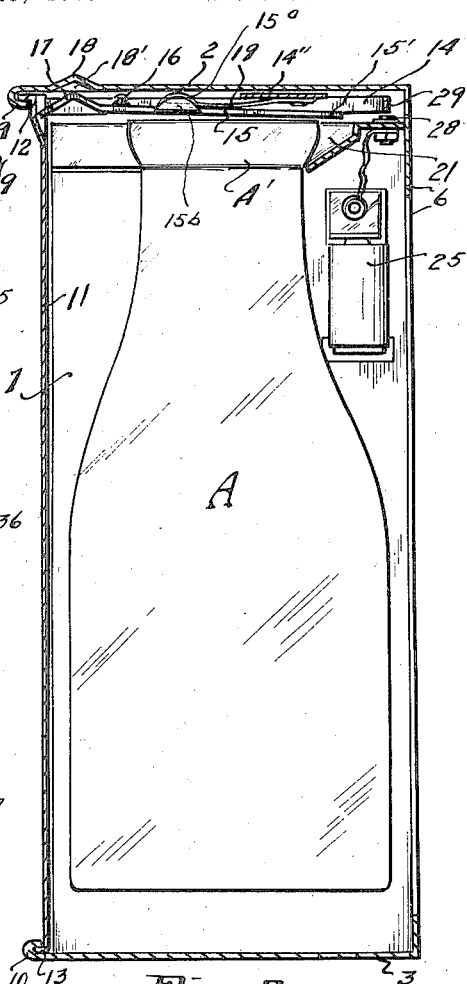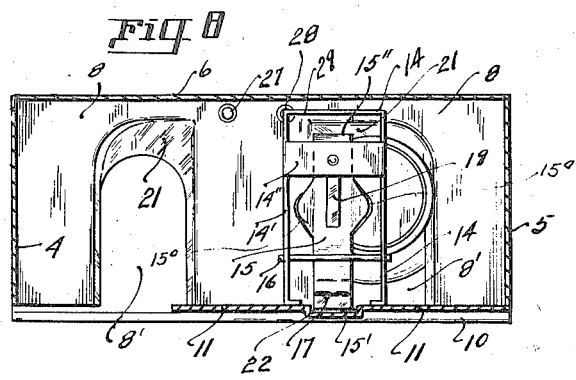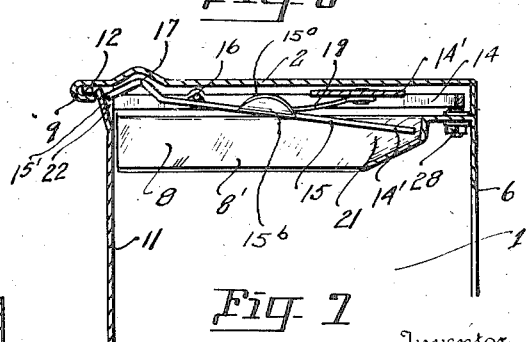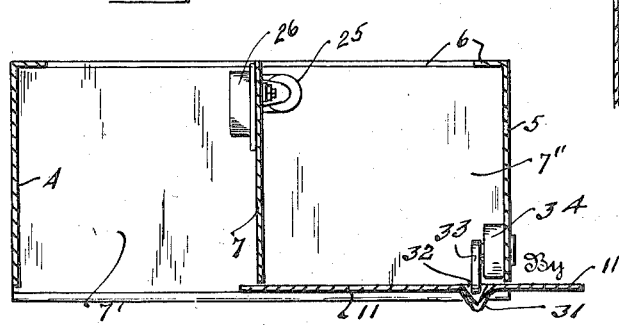

Patented May 19, 1936

2,041,257

UNITED STATES PATENT OFFICE 2,041,257

MILK BOTTLE HOLDER AND LOCKBOX

John H. McManus, Salem, Oreg.

Application March 26, 1935, Serial No. 13,059

5 Claims. (Cl. 232—41)

This invention is a milk bottle holder to be employed in delivering filled milk bottles and picking up empty milk bottles, the essential object of the invention being to protect both the empty and filled milk bottles against damage and theft. The invention essentially consists of a bottle supporting member provided with compartments for the reception of filled and empty bottles, and mechanism in conjunction therewith which requires the insertion of an empty bottle in the holder in order to withdraw a filled bottle, or vice versa.

One of the objects of the invention is to provide a holder which will adequately protect milk bottles from theft, damage and the like.

Another object of the invention is to provide a holder which will prevent the removal of a bottle until a bottle, either empty or filled has been inserted therein, thereby securing a constant exchange of bottles, and preventing the customer from retaining bottles in his or her possession.

Another object of the invention is to provide a neat and sanitary device for the dispensing of food products.

Other, further and additional objects of the invention will be ascertained upon reading the description thereof aided by the accompanying drawings, wherein Figure 1 is a perspective of the invention, viewing it largely from in front. This view shows one compartment of the holder closed and the other compartment partially closed.

Figure 5 is a front elevation of the box with the sliding door removed. This view shows the bottle supports and parts of the stop or catch mechanism.

Figure 6 is an end sectional elevation shown on line 6—6 in the preceding figure, but with the door mounted.

Figure 7 is the end section, enlarged, indicated by section line 7—7 in Figure 2.

Figure 8 is a plan view with the top of the box or holder removed in order to illustrate the bottle supporting means and the means controlling the operation of the sliding door.

Figure 9 is the horizontal section indicated by the section line 9—9 in Figure 5. This view disclosing a locking device for locking the door against movement.

In the drawings:

Figure 1:
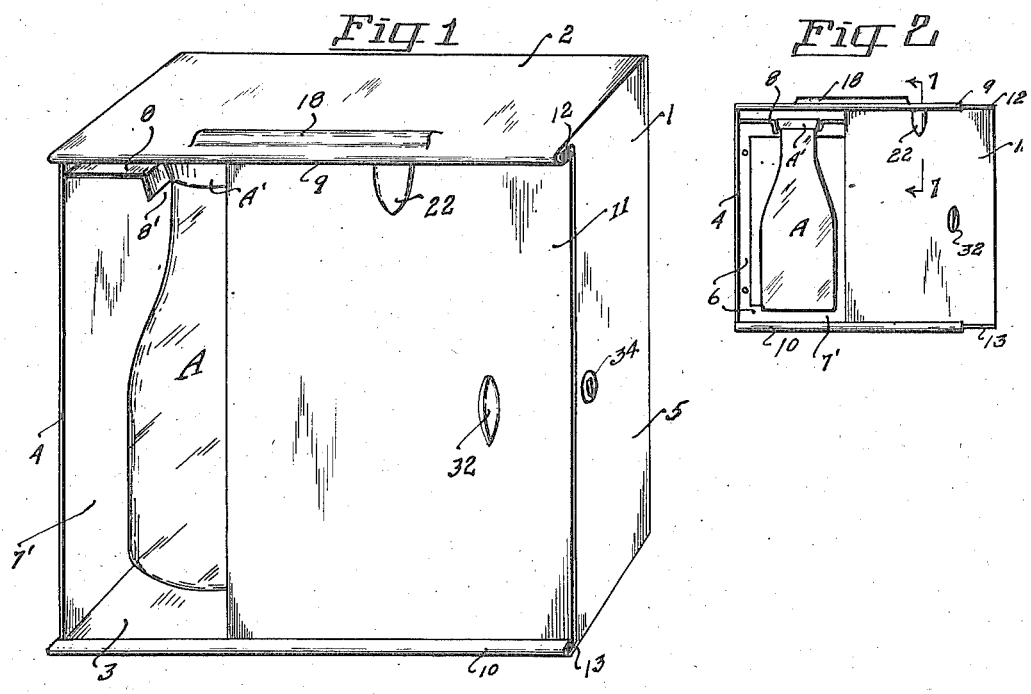
Figure 2:
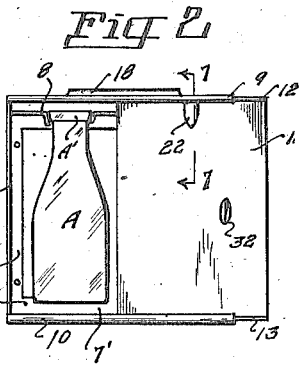
Figure 2 is a front elevation of the holder or box with one compartment open.
Figure 4:
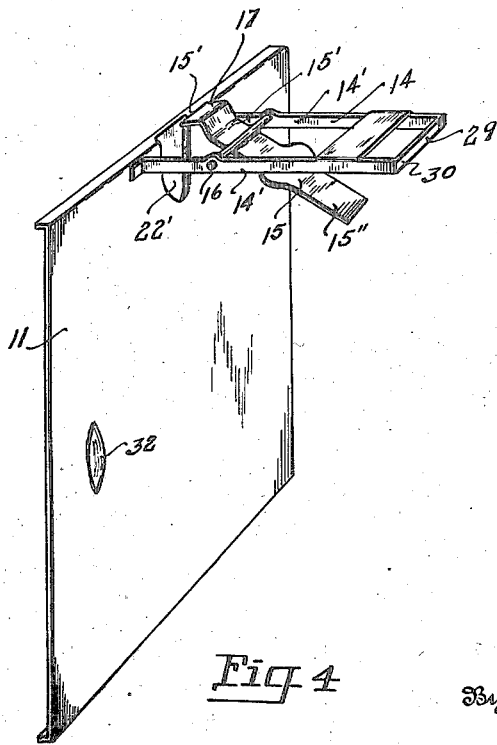
Figure 4 is a perspective of the door slidable over one or the other of the compartments or sections of the box or holder. This view shows the stop or catch mechanism controlling the sliding of the door.
Figure 3:
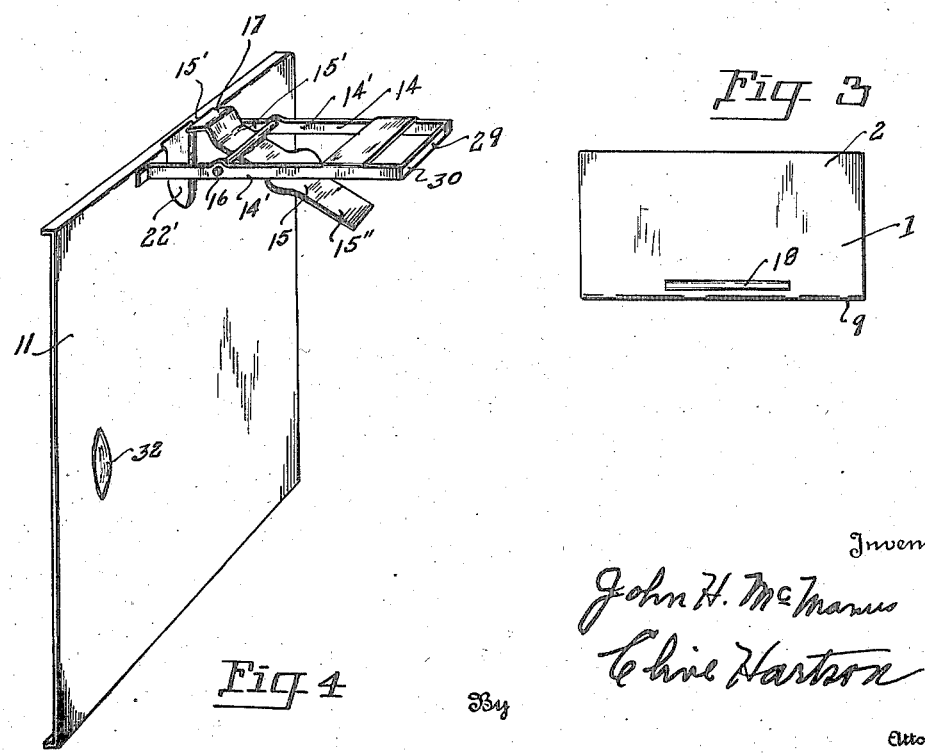
Figure 3 is a plan view looking down on the top of the milk box.

1 indicates the box or holder. In this embodiment it consists of a rectangular structure embodying top and bottom 2 and 3, ends 4 and 5 and rear or back flange portion 6 united to form a box like member open to the front. The interior of the holder is divided into two or more compartments as the case may be. In the present instance a partition 7 is provided intermediate the ends of the holder dividing it into two compartments 7' and 7''. Within each compartment and spaced from the top is a bottle supporting member 8, each of which is provided with cut-out or notch 8' within which the neck portion of a milk bottle, such as the bottle A, may be inserted. The dimensions of the cut-out is such that the lip $a'$ of the bottle rests upon the edges of the member 8 defining the cut-out.

The top and bottom 2 and 3 project somewhat and curl backwardly to provide the slides 9 and 10 which mount the sliding door 11 by means of its upper and lower flanges 12 and 13 which are seated respectively in slides 9 and 10. This door is somewhat longer than compartments 7' and 7'', but not quite as long as the length of the holder, so that when one compartment is closed the other is partially uncovered, sufficiently so to permit the insertion or removal of a bottle from holder 8 of the compartment.

Centered at the top and rearwardly of the door is a catch supporting member or frame 14 having two parallel members 14' and a cross member 14'' spacing the parallel members apart, the outer ends of the parallel members being secured to the door. Pivotally mounted to the catch frame between the sides 14' and thereto, and beneath the cross member 14'' is the catch 15 by means of the pin 16 which pin is substantially toward its forward end 15'. The forward end of the catch is provided with an offset portion 17 upwardly directed toward the top 2. The top 2 is provided with a pressed out portion interiorly constituting a guideway 18 within which the portion 17 is urged by the spring 19 attached to the underside of the cross member 14''. Inasmuch as the offset portion rides in the guideway 18 when the door 11 is slid back and forth, it will be seen that this will limit the complete opening of either compartment. The spring 19 presses down the rearward portion 15'' of the catch thus elevating the offset portion 17. However if the compartments are holding bottles, the rearward portion 15'' will ride upon the tops of the bottles, thus lowering the offset portion 17, or removing it from the guideway. To aid portion 15'' to ride over the tops of the bottles, this portion is provided on opposite sides with inclined ears 15a having cam surfaces 15b which engage the bottle tops. These ears are moved upwardly by such engagement and consequently carry the rearward portion 15'' therewith.

In operation, viewing Figure 5, which does not show the door, but shows the catch or latch mechanism, and Figure 8, which does not show the top but shows the door and latch or catch mechanism, the door has been moved to the right and covers or closes the right hand compartment which has the milk bottle A therein. In moving to the right the offset portion 17 is lowered by reason of the fact that the rearward portion 15" of the latch is raised by the top of the bottle. However if one tries to open the compartment by moving the door to the left, the rearward end of the catch will drop in the left compartment causing the offset portion 17 to engage the left hand end or stop 18' of the guideway 18 thus limiting the opening of the right hand compartment. Though the latter compartment is partially open, it is not open sufficiently however to permit the removal of the bottle. However if the door is again returned to cover the right hand compartment and a bottle is inserted in the left hand compartment and then moved to the left, the rearward end of the catch will engage the new bottle, lowering the offset portion or catch from the guideway and thus permitting the complete sliding of the door from the right hand compartment and allowing the removal of the bottle. After the bottle has been removed, the door cannot be moved to the right sufficiently to remove the bottle in the left hand compartment, for the reason that there being no bottle in the right hand compartment allows the offset catch to rest and engage the end or stop 18" of the guideway 18, thus preventing complete opening to the left hand compartment. However when a milk bottle is placed in the right hand compartment the catch is removed from the guideway and the door may be freely moved to uncover first one compartment and then the other. From the foregoing it will be readily seen that the person delivering bottles, a milkman for instance, must first place a bottle in the holder before he can remove one, thus he places a filled bottle in the holder and receives an empty one in exchange, while the customer places an empty bottle in the holder and receive a filled bottle in exchange, thus compelling the customer to return an empty bottle for each full bottle.

When traveling from an empty compartment to the other, on account of portions 8 being somewhat depressed and thereby providing an elevated central portion, inclined faces 21 are provided up which the rearward end 15" of the catch may travel and thus not be stopped by such central portion. In order not to limit the movement of the catch the door 11 is outwardly pressed at 22 to provide an interior recess 22' for the operation of the end 15' of the latch.

A warning of the operation may be provided by supplying a battery and buzzer 25 and 26 in circuit with contacts 27 and 28 which circuit is closed by the contacts 29 and 30 when moved thereacross the circuit being completed through the frame 14.

The door 11 may be pressed out at 31 to provide an operating handle as well as to provide an interior recess 32 to receive the lock arm 33 of the lock 34, unlocking and locking of the lock moving the arm out of and into the recess, thus providing means for locking the sliding door against movement.

The placing of the holder may be in accordance with individual desires, preferably the box may be mounted to a vertical surface such as a wall. This can be done by means of pins passing through eyes 36 in the back portion 6.

The mechanism described above can be adapted to a great number of compartments within the same lock box. The bottles could also be removed from the rear when installed, having an opening into the house.

While my invention is admirably adapted to being used as herein illustrated and described, I do not wish to be limited to this particular form of embodiment as my invention is adapted to other forms of construction still coming within the scope of the claims.

Having described my invention, I claim

1. A milk bottle holder embodying a box like structure open at the front and divided into compartments, means in each compartment for suspending a milk bottle by its lip flange, a slidable door movable before one or the other of the compartments, a latching arrangement secured to the inner side of the door, said latching arrangement securing the door against opening to a compartment containing a bottle when the other compartment is empty and releasing the door when engaged by a bottle placed in the empty compartment.

2. A milk bottle holder embodying a structure having a delivery and a receiving chamber, a door slidable to close the one or the other chamber, a latch device carried by the door interiorly, stationary stops at opposite ends of a limited movement of the latch, said latch engaging a stop and preventing the door from being moved from in front of the delivery chamber when the receiving chamber is empty, and engaging a milk bottle placed in the receiving chamber and being moved out of engagement with said stop and thereby permitting the door being moved from in front of the delivery chamber.

3. A milk bottle holder embodying a structure having two chambers each adapted for supporting a milk bottle, a door slidable to close one or the other of the chambers, a pivotally mounted latch member carried by the door, said latch member having a portion engaging milk bottles in said holder, stops engaged by the latch and limiting the movement of the door, said latch and said stops permitting the door to slide freely when both chambers contain bottles and holding the door before a chamber holding a bottle when the other chamber is empty.

4. A milk bottle holder embodying a structure having two compartments provided with corresponding openings, a door movable to cover either opening, bottle holding means in each compartment, and a latch mechanism carried by the door holding the door before one of the compartments and released upon engagement with a bottle inserted in the bottle holding means of the other compartment.

5. A milk bottle holder embodying a housing having two compartments open to the front, a slidable door to close the opening to either compartment, a bottle support in each compartment, and a latch mechanism mounted to the inner side of the door holding the door before one of the compartments and released upon engagement with a bottle inserted in the bottle support means of the other compartment.

JOHN H. McMANUS.